United States Patent
Gommé et al.

(10) Patent No.: US 11,368,193 B2
(45) Date of Patent: Jun. 21, 2022

(54) NEAR-FIELD ELECTROMAGNETIC INDUCTION (NFEMI) ANTENNA

(71) Applicant: NXP B.V., Eindhoven (NL)

(72) Inventors: Liesbeth Gommé, Anderlecht (BE); Anthony Kerselaers, Herselt (BE)

(73) Assignee: NXP B.V., Eindhoven (NL)

( * ) Notice: Subject to any disclaimer, the term of this patent is extended or adjusted under 35 U.S.C. 154(b) by 100 days.

(21) Appl. No.: 16/781,050

(22) Filed: Feb. 4, 2020

(65) Prior Publication Data

US 2021/0242908 A1    Aug. 5, 2021

(51) Int. Cl.
| | | |
|---|---|---|
| H04B 5/00 | (2006.01) | |
| H01Q 1/36 | (2006.01) | |
| H01Q 7/00 | (2006.01) | |
| H01Q 1/24 | (2006.01) | |
| H01Q 1/27 | (2006.01) | |
| H01Q 9/28 | (2006.01) | |
| H01Q 21/00 | (2006.01) | |

(52) U.S. Cl.
CPC ........ *H04B 5/0081* (2013.01); *H01Q 1/243* (2013.01); *H01Q 1/273* (2013.01); *H01Q 1/36* (2013.01); *H01Q 7/00* (2013.01); *H01Q 9/285* (2013.01); *H01Q 21/0006* (2013.01); *H04B 5/0012* (2013.01); *H04B 5/0025* (2013.01)

(58) Field of Classification Search
CPC .. H04B 5/0081; H04B 5/0087; H04B 5/0093; H04B 5/0012; H04B 5/00; H04B 5/0025; H01Q 1/273; H01Q 1/36; H01Q 7/00; H01Q 9/285; H01Q 21/0006; H01Q 1/243; H01Q 1/27; H01Q 21/006

USPC .................................................... 455/41.1
See application file for complete search history.

(56) References Cited

U.S. PATENT DOCUMENTS

| | | | | |
|---|---|---|---|---|
| 9,197,986 | B1 * | 11/2015 | Kerselaers | H04W 4/80 |
| 9,941,937 | B1 * | 4/2018 | Kerselaers | H01Q 7/08 |
| 10,355,791 | B1 * | 7/2019 | Kerselaers | H04W 24/08 |
| 10,491,270 | B1 * | 11/2019 | Kerselaers | H04B 5/0056 |
| 10,498,397 | B1 * | 12/2019 | Nackaerts | H04B 1/385 |
| 10,601,467 | B1 * | 3/2020 | Gomme | H04B 5/0012 |
| 10,763,921 | B1 * | 9/2020 | Kerselaers | H04B 5/0081 |

(Continued)

FOREIGN PATENT DOCUMENTS

| | | | |
|---|---|---|---|
| CN | 107732406 A1 * | 9/2017 | ............ H01Q 1/38 |
| EP | 3242355 A1 | 11/2017 | |

OTHER PUBLICATIONS

U.S. Appl. No. 16/122,970; not yet published; 35 pages (Sep. 6, 2018).

(Continued)

*Primary Examiner* — Blane J Jackson

(57) ABSTRACT

One example discloses a device including a near-field electromagnetic induction (NFEMI) antenna, including: a first inductive coil having a first end coupled to a first feed connection and a second end coupled to a second feed connection; a second inductive coil, having a first end coupled to either end of the first inductive coil or either one of the feed connections; wherein a second end of the second inductive coil is electrically open-ended; wherein the first inductive coil is configured to receive or transmit near-field magnetic signals; and wherein the second inductive coil is configured to receive or transmit near-field electric signals.

21 Claims, 8 Drawing Sheets

(56) References Cited

U.S. PATENT DOCUMENTS

| | | | | |
|---|---|---|---|---|
| 2013/0229319 | A1* | 9/2013 | Miura | H01Q 9/27 343/788 |
| 2015/0042524 | A1* | 2/2015 | Kerselaers | H01Q 1/245 343/718 |
| 2015/0318603 | A1* | 11/2015 | Kerselaers | H04B 13/005 381/315 |
| 2015/0318932 | A1* | 11/2015 | Kerselaers | H04B 5/02 381/315 |
| 2015/0319545 | A1* | 11/2015 | Kerselaers | G16H 20/40 381/315 |
| 2016/0149313 | A1* | 5/2016 | Gomme | H01Q 1/2208 343/725 |
| 2016/0344109 | A1* | 11/2016 | Gomme | H01Q 5/40 |
| 2017/0062949 | A1* | 3/2017 | Kerselaers | H01Q 7/08 |
| 2017/0272128 | A1* | 9/2017 | Tanaka | H04B 5/0037 |
| 2017/0324170 | A1* | 11/2017 | Kerselaers | H04B 5/0031 |
| 2018/0219273 | A1* | 8/2018 | Kerselaers | H01Q 1/2291 |
| 2018/0241116 | A1* | 8/2018 | Kerselaers | H01Q 1/44 |
| 2018/0287268 | A1* | 10/2018 | Kosaka | H01Q 21/061 |
| 2019/0296439 | A1 | 9/2019 | Kerselaers et al. | |
| 2020/0294707 | A1* | 9/2020 | Bromberger | H03F 1/565 |

OTHER PUBLICATIONS 802.15 IEEE Standard for Local and metropolitan area networks—Part 15.6: Wireless Body Area Networks; IEEE Computer Society, NY, NY, US; 271 pages (Feb. 29, 2012).

* cited by examiner

NEAR-FIELD ELECTROMAGNETIC INDUCTION (NFEMI) ANTENNA

The present specification relates to systems, methods, apparatuses, devices, articles of manufacture and instructions for near-field electromagnetic induction communications.

SUMMARY

According to an example embodiment, a device including a near-field electromagnetic induction (NFEMI) antenna, comprising: a first inductive coil having a first end coupled to a first feed connection and a second end coupled to a second feed connection; a second inductive coil, having a first end coupled to either end of the first inductive coil or either one of the feed connections; wherein a second end of the second inductive coil is electrically open-ended; wherein the first inductive coil is configured to receive or transmit near-field magnetic signals; and wherein the second inductive coil is configured to receive or transmit near-field electric signals.

In another example embodiment, the first inductive coil and the feed connections are configured to carry a current; and the current is based on the near-field magnetic signals.

In another example embodiment, the second inductive coil is configured to carry a voltage; and the voltage is based on the near-field electric signals.

In another example embodiment, the second inductive coil is only galvanically coupled to either end of the first inductive coil or either one of the feed connections.

In another example embodiment, the second inductive coil has a planar geometry.

In another example embodiment, the planar geometry of the second inductive coil is formed in a shape including: a circle, a rectangle, a polygon, an oval, or a diamond.

In another example embodiment, the first and second inductive coils have a same winding direction.

In another example embodiment, the first and second inductive coils are physically juxtaposed as a set of curved parallel wires separated by a distance.

In another example embodiment, the second inductive coil is surrounded by the first inductive coil; and the electrically open-ended second end is surrounded by both the first and second inductive coils.

In another example embodiment, the first and second inductive coils are geometrically positioned to have a distributed capacitance between the first and second inductive coils.

In another example embodiment, the first and second inductive coils are coupled in series.

In another example embodiment, the first and second inductive coils are configured to have a same magnetic flux direction.

In another example embodiment, the second end of the second inductive coil is not galvanically connected to any other element or structure in the antenna.

In another example embodiment, the second inductive coil includes a looped element or structure; and the looped element or structure is at least one of: helical, a planar spiral, or a three-dimensional spiral.

In another example embodiment, the second inductive coil is configured to have a non-uniform voltage distribution during operation.

In another example embodiment, the second inductive coil is configured to have a linearly increasing voltage distribution, having a highest absolute amplitude at the second end which is open-ended.

In another example embodiment, the near-field antenna does not include a conductive plate.

In another example embodiment, the second inductive coil is not coupled to a conductive plate.

In another example embodiment, the conductive plate is an element or structure configured to have a same voltage and/or electric-field throughout all portions of the conductive plate.

In another example embodiment, the first inductive coil is configured to receive or transmit non-propagating quasi-static magnetic near-field signals; and the second inductive coil is configured to receive or transmit non-propagating quasi-static electric near-field signals.

In another example embodiment, the antenna is embedded in at least one of: a glucose sensor, a wearable device; a smart watch; a smartwatch housing, a wireless mobile device, an earbud, a hearing aid, a headphone, an activity tracker, or a heart rate monitor.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings.

BRIEF DESCRIPTION OF THE DRAWINGS

FIG. 3B-2 is an opposite side of the fourth example dual-coil NFEMI antenna.

Figure 1A:
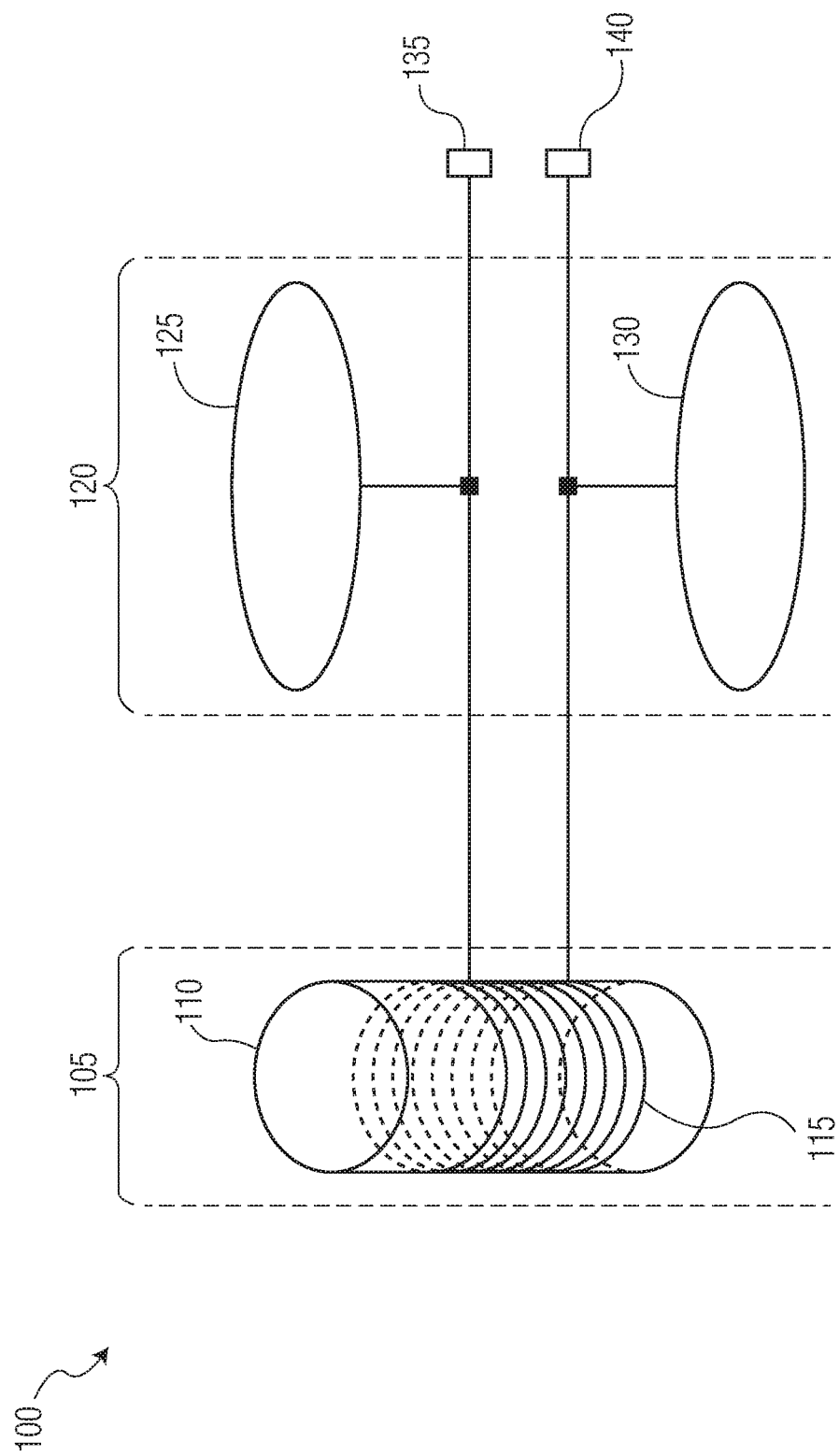
FIG. 1A is an example single-coil near-field electromagnetic induction (NFEMI) antenna.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Herein discussed are near-field interactions between a near-field device, perhaps on a user's body, and other conductive surfaces and/or other wireless networked devices (e.g. Internet of Things (IoT) devices) based on near-field electromagnetic induction (NFEMI), where the transmitter and receiver are coupled by both magnetic (H) and electric (E) fields. While RF wireless communication is accomplished by propagating an RF plane wave through free space, NFEMI communication utilizes non-propagating quasi-static H and E fields.

An H-field antenna (i.e. magnetic antenna) is primarily sensitive to magnetic fields and/or primarily initiates magnetic fields when driven by a current. Any E-field component from an H-field antenna is strongly reduced (e.g. −20 to −60 dB reduction, a factor of 0.1 to 0.0008 (10% to 0.08%) depending on the antenna design).

A small loop antenna is an example H-field antenna and includes a loop antenna with dimensions much smaller than the wavelength of its use. The small loop antenna does not resonate at the NFEMI carrier frequency but is instead tuned to resonance by an external reactance. In some example embodiments the current in the small loop antenna has in every position of the loop the same value.

An E-field antenna (i.e. electric antenna) is primarily sensitive to electric fields and/or primarily initiates electric fields when driven by a voltage. Any H-field component from an E-field antenna is strongly reduced (e.g. −20 to −60 dB reduction, a factor of 0.1 to 0.0008 (10% to 0.08%) depending on the antenna design).

A short loaded dipole antenna is an example E-field antenna and includes a short dipole with dimensions much smaller than the NFEMI carrier frequency and in some example embodiments has extra capacitance surfaces at both ends.

The quasi-static characteristic of these fields is a result of the NFEMI antenna dimensions in combination with their carrier frequencies. Most of the near-field energy is stored in the form of magnetic and electric fields, while a small amount of RF energy inevitably propagates in free space. Small antenna geometries minimize radiating waves in free space.

Some wearables, such as hearing aids and wireless earbuds, employ Near-Field Magnetic Induction (NFMI) as a wireless communication method. In NFMI wireless communication, two loosely coupled coils realize signal transfer. No radiation of radio waves takes place. A current flowing in the transmission coil generates a H-field which in turn induces a current in the receiving coil. In this way, wireless communication is accomplished. Unfortunately, H-field based NFMI systems with small antenna coils have a limited range that may be much smaller than an entire wearable user's body. Such H-field communications are sensitive to coil orientation. In the case of a hearing aid form factor, a H-field induction based system cannot cover an entire human body. However, since in hearing aids both coils are always aligned with each other, they are not influenced by the movement of the human body.

Other wearables employ Near-field Electric Induction (NFEI)) as a wireless communication method. NFEI allows electronic devices on and near a conductive surface (e.g. a human body) to exchange information through E-field coupling (e.g. at 21 MHz). NFEI is also sometimes called Body Coupled Communication (BCC). While E-field based NFEI signals can have a greater range than H-field based NFMI signals, the E-field signal strength can vary with regard to body posture and is sensitive to body movements. The body can even partially block a capacitive return path, thereby increasing E-field channel loss and reliable and robust wireless communication is not possible.

FIG. 1A is an example single coil near-field electromagnetic induction (NFEMI) antenna 100. In some example embodiments, the antenna 100 includes a coil (H-field) antenna 105 for magnetic fields, in conjunction with a short loaded dipole (E-field) antenna 120 for electric fields. The H-field antenna 105 includes a ferrite core 110 wound with wire 115. The E-field antenna 120 includes two conductive loading structures 125 and 130. Antenna 100 feed points 135, 140 are coupled to various transceiver circuitry, such as downstream radio transmitter and receiver integrated circuit (RF-IC), (not shown here).

When the NFEMI antenna 100 is proximate to a structure (e.g. a conductive structure, a body, a person, an object, etc.) the magnetic and electric fields will be substantially confined to the structure and not significantly radiate in free-space. This enhances security and privacy of such body networked communications.

In various example embodiments, the antenna 100 operates at or below 50 MHz (e.g. for example at 30 MHz) to ensure that the fields are following the structure's contours and to ensure that far field radiation is strongly reduced.

Figure 1B:
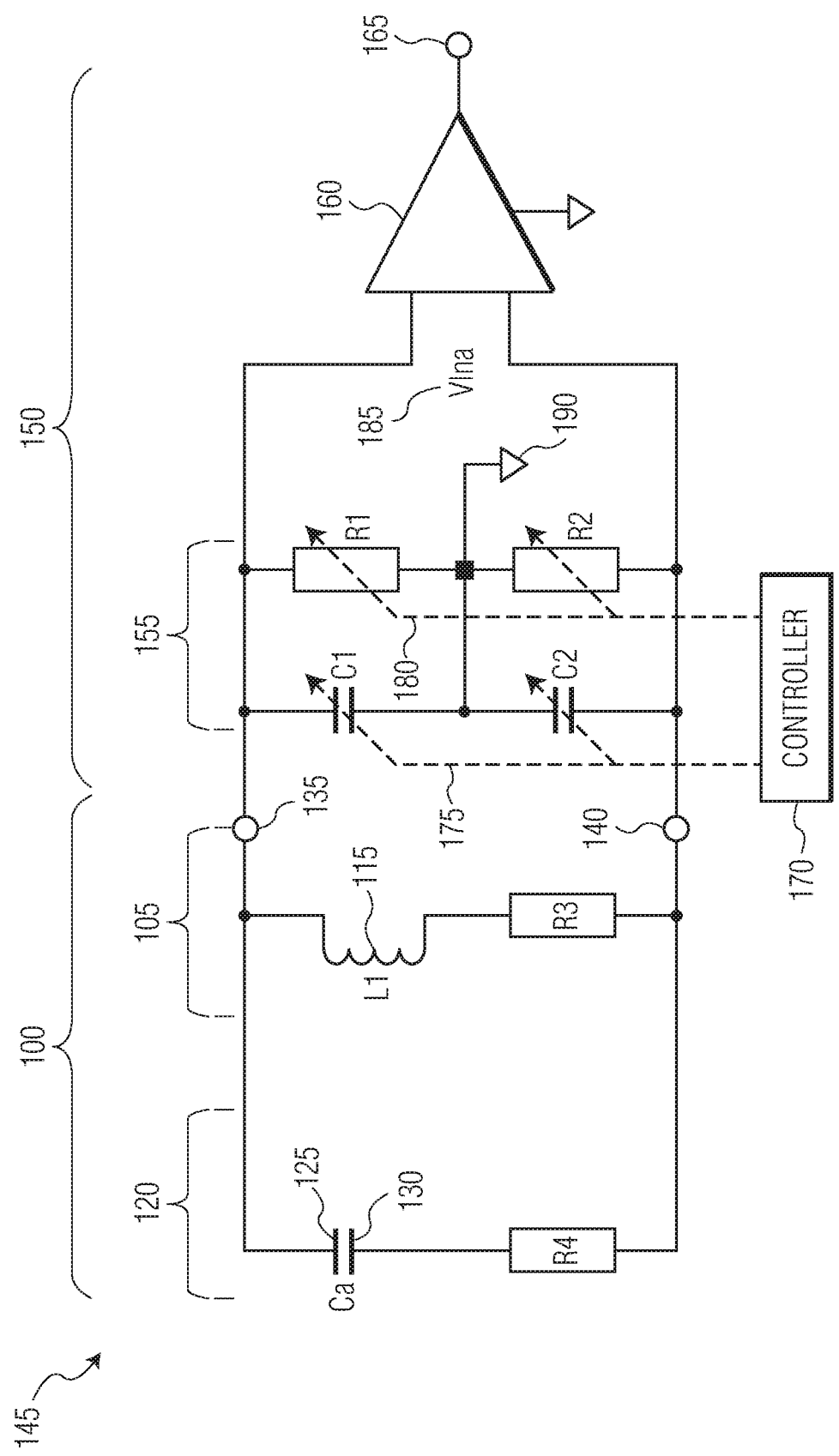
FIG. 1B is an example near-field device including the single-coil near-field antenna, supporting circuits, and configured to receive non-propagating quasi-static near-field signals.

FIG. 1B is an example near-field device 145 including the single coil near-field antenna 100, supporting circuits 150, and configured to receive non-propagating quasi-static near-field signals. The near-field device 145 is configured to receive (e.g. in a receive mode) a non-propagating quasi-static near-field signal. Note that the near-field antenna 100 may also be coupled to a transmitter circuit (not shown) for two-way communications.

The example idealized antenna 100 includes the magnetic (H-field) antenna 105 having a resistance (R3) and an inductance (L1), the electric (E-field) antenna 120 having a conductive structure formed from the two loading plates 125 and 130, and the two feeding points 135, 140.

The supporting circuits 150 include a tuning circuit 155, an LNA 160 (low noise amplifier), a communications signal interface 165, and a controller 170.

The tuning circuit 155 is coupled to the first and second feed points 135, 140. The tuning circuit 155 includes a first variable tuning capacitance bank (C1), a second variable tuning capacitance bank (C2), a first variable tuning resistance bank (R1), and a second variable tuning resistance bank (R2). The capacitance banks and resistance banks are coupled to a reference potential 190 (e.g. a ground potential). The capacitive banks are coupled to the controller 170 by control line 175, and the resistance banks are coupled to the controller 170 by control line 180.

The controller 170 adjusts the first and second capacitance banks (C1), (C2) to adjust a resonant frequency of the magnetic 105 and the electric 120 antennas (e.g. to 10.6 MHz). The controller 170 adjusts the first and second resistance banks (R1), (R2) to adjust a bandwidth of the magnetic 105 and the electric 120 antennas (e.g. to 400 KHz) sufficient to allow the non-propagating quasi-static near-field signal to be received from the antennas 105, 120.

The capacitance banks (C1), (C2) are equally tuned using the control line 175 from the controller 170, and the resistance banks (R1), (R2) are equally tuned using the control line 180 from the controller 170.

The LNA 160 is coupled between the tuning circuit 155 and a communications signal interface 165. When the near-field device 145 is receiving the non-propagating quasi-static near-field signal, induced voltage 185 (Vlna) is present across the LNA 160 differential inputs. The LNA 160 amplifies the received near-field signal which is then further processed by additional radio/RFIC/baseband circuits (not shown) coupled to the communications signal interface 165. The LNA 160 is also coupled to the reference potential 190.

Since both inputs to the LNA 160 are coupled to the antennas 105, 120 the near-field device's 145 configuration is said to be balanced. The balanced circuit configuration helps reject interference signals that enter both LNA 160 input lines with the same amplitude and phase. In other examples an unbalanced device can be used.

During operation a voltage is induced in the electric (E-field) antenna 120 by a received near-field electric signal. This voltage generates a current through the E-field antenna 120. The received voltage is defined by:

$$U = Q\frac{C_a}{C_a + C_t}.$$

where:
U voltage at the LNA 160 input [Volts]
Ca electric antenna 120 equivalent capacitance
Ct Tuning capacitance (e.g. combination of C1 and C2)

Figure 2A:
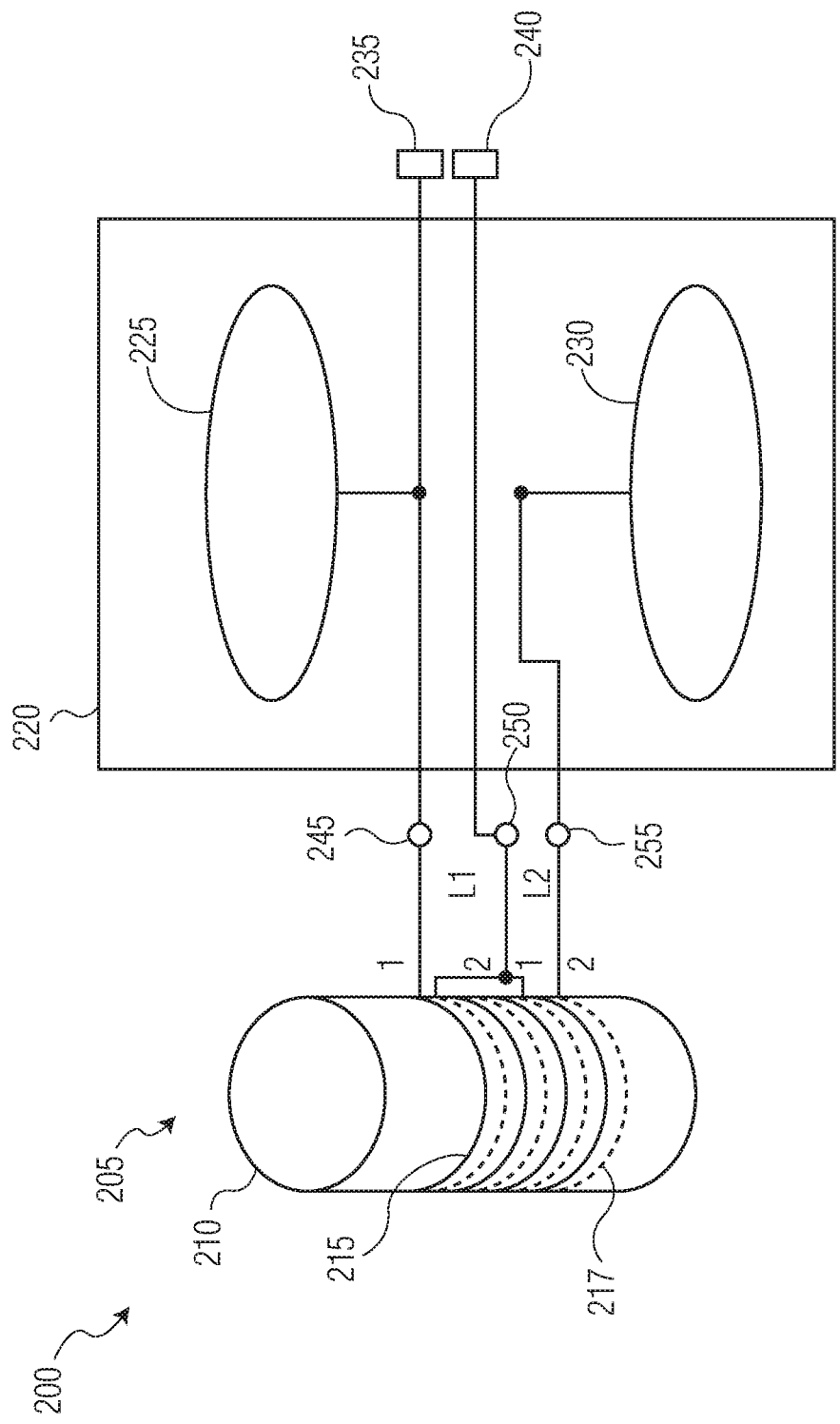
FIG. 2A is a first example dual-coil NFEMI antenna.

FIG. 2A is a first example dual-coil NFEMI antenna 200. The antenna 200 includes a short loaded dipole portion 220 with two conductive loading plates 225, 230 and a small loop antenna 205.

The small loop antenna includes at least two coupled coils 215 and 217. The first coil 215 has an inductance of L1, and the second coil 217 has an inductance of L2. Both coils 215 and 217 may be connected, at connection point 250, such that they form a larger inductance compared with the inductance of the first coil 215 and the second coil 217.

Figure 2B:
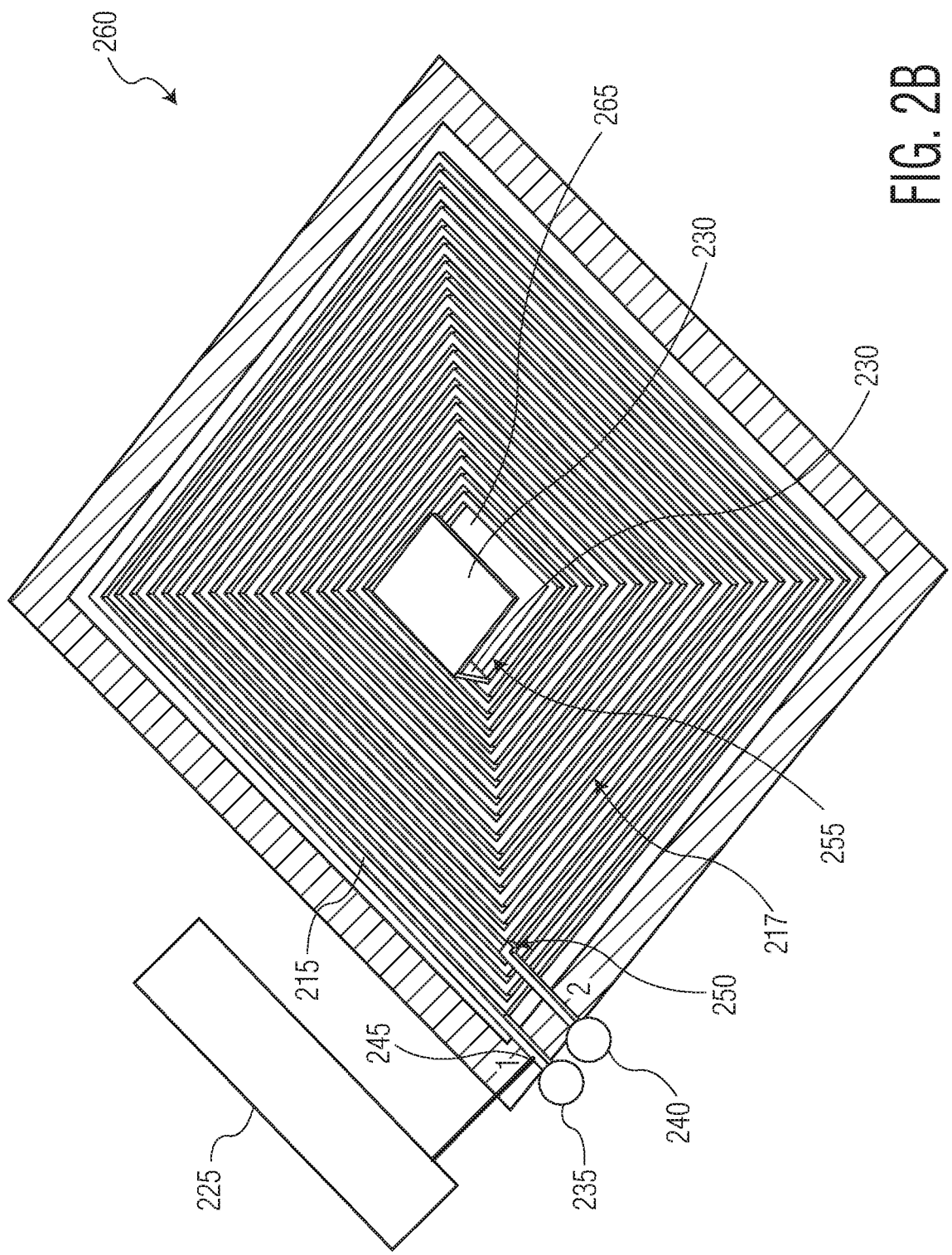
FIG. 2B is a second example dual-coil NFEMI antenna.
Figure 3A:
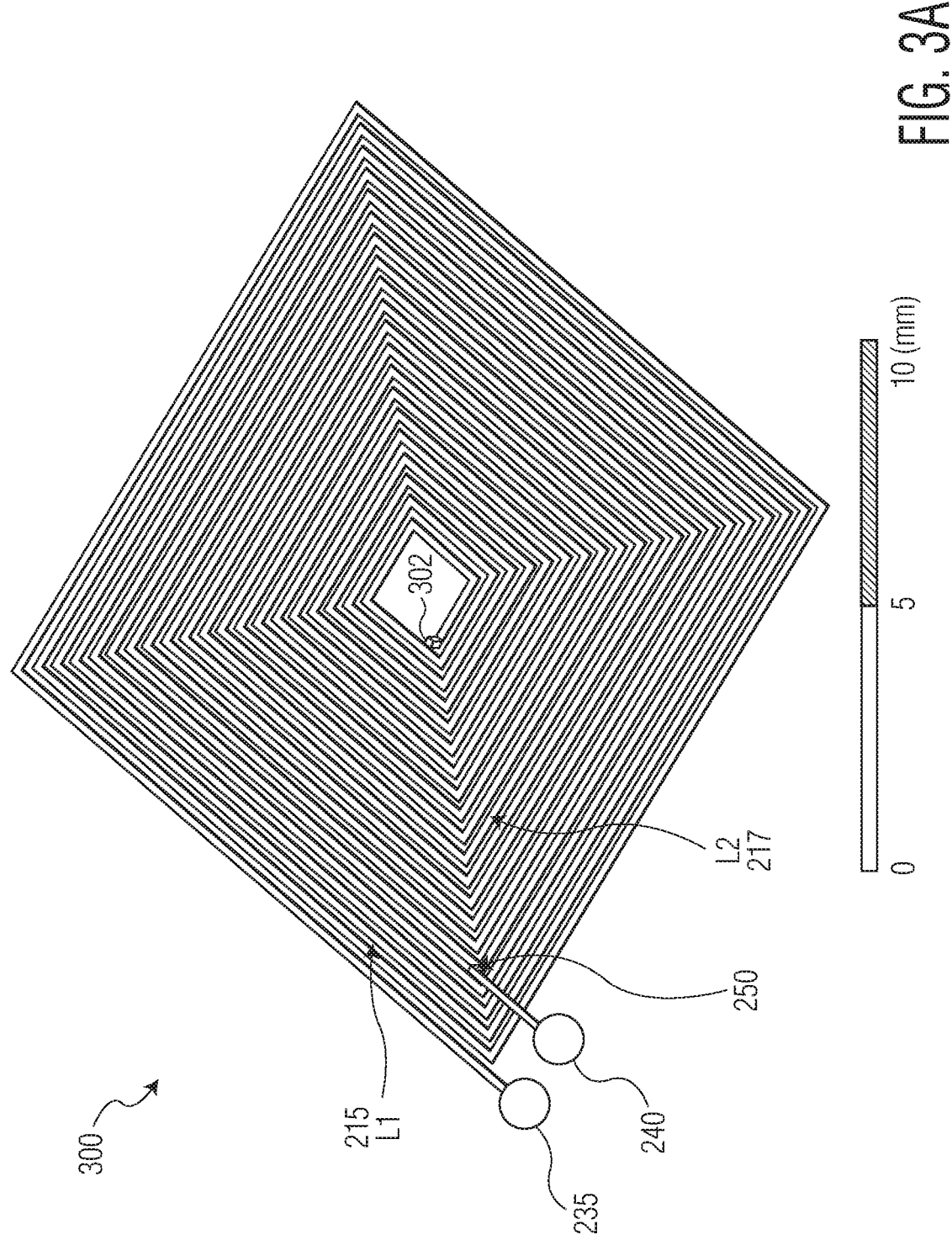
FIG. 3A is a third example dual-coil NFEMI antenna.
Figures 2, 3B:
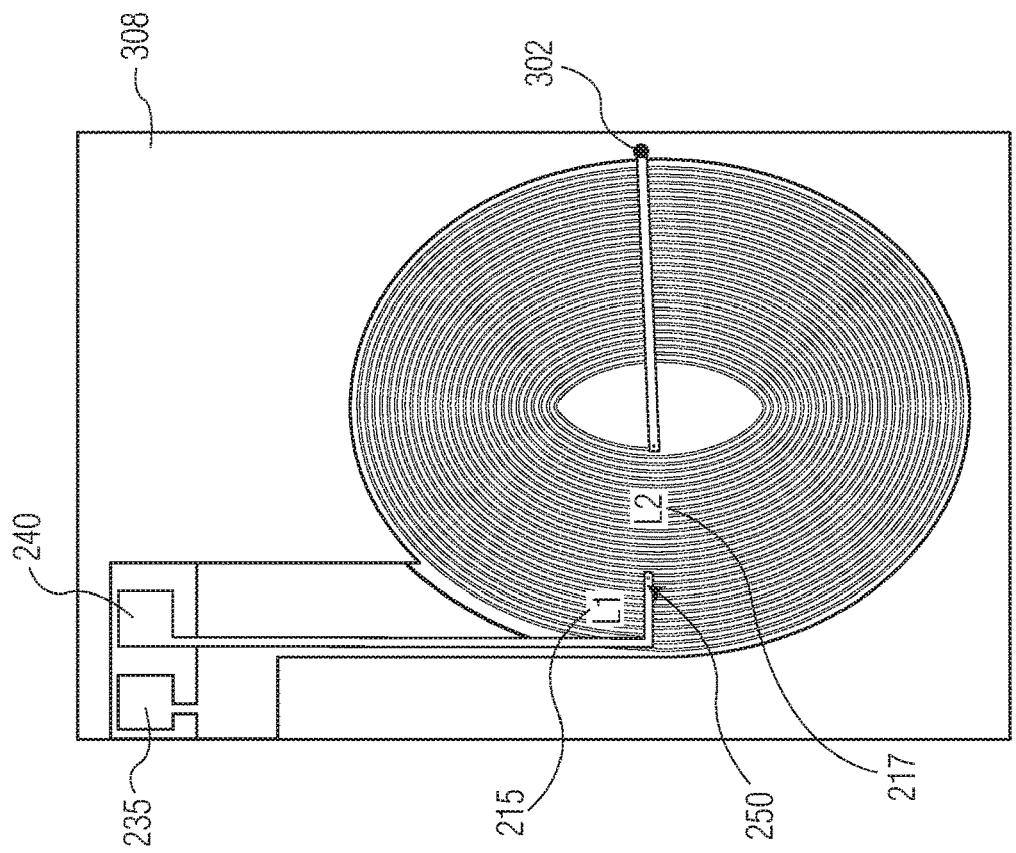

Both coils 215 and 217 may be air coils, wrapped around a ferrite core 210 (as shown in FIG. 2), or they can be in the form of a planar structure (see FIG. 2B for an example planar coil structure).

In the ferrite core 210 version, the coils 215 and 217 may be wrapped around the core 210 in an interleaved fashion, or wrapped on top of one another, i.e., the second coil 217 is first wrapped around the core 210, and then the first coil 215 is then wrapped around the core 210 on top of the second coil 217.

Connection point 245 couples one end of the first coil 215 to a first feeding connection 235 and to the first plate of the small loaded dipole 225. Connection point 250 couples another end of the first coil 215 to one end of the second coil 217 and to a second feeding connection 240. Connection point 255 couples another end of the second coil 217 to the second plate 230 of the small loaded dipole 220.

FIG. 2B is a second example dual-coil NFEMI antenna 260. The antenna 260 includes coupled coils 215 (L1) and 217 (L2), conductive loading plates 225, 230, a first feeding connection 235, a second feeding connection 240, and connection points 245, 250, 255.

Note that while these elements in FIG. 2B are different from FIG. 2A, they function similarly and thus the reference numbers are kept the same for clarity of discussion purposes only. The main differences however are that the coupled coils 215 (L1) and 217 (L2) are nested (e.g. L2 is surrounded by L1) and planar. Also there is an air gap 265 under conductive loading plate 230.

Figure 2C:
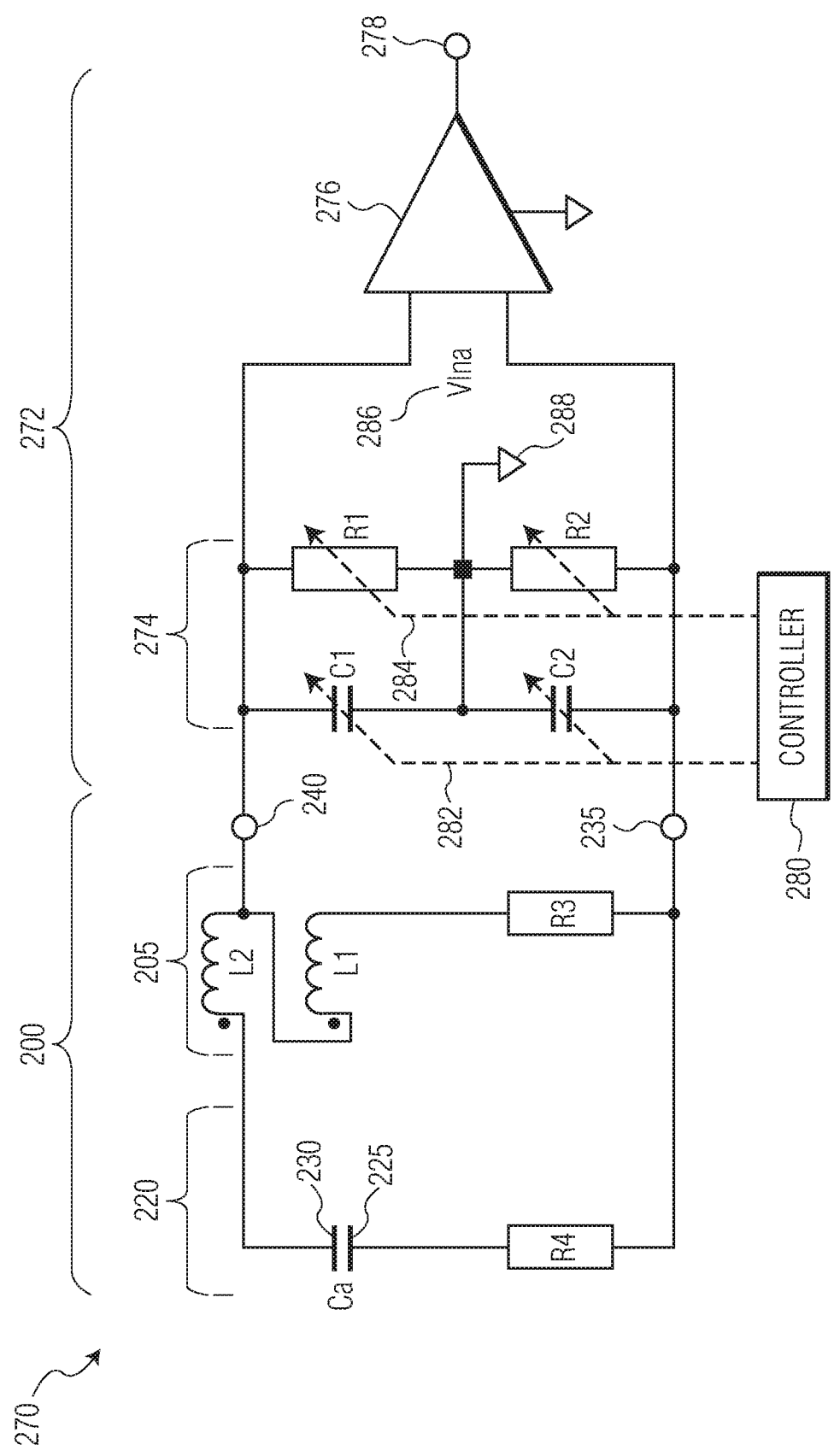
FIG. 2C is an example near-field device including the dual-coil near-field antenna, supporting circuits, and configured to receive non-propagating quasi-static near-field signals.

FIG. 2C is an example near-field device 270 including the dual-coil near-field antenna 200, supporting circuits 272, and configured to receive non-propagating quasi-static near-field signals. The near-field device 270 is configured to receive (e.g. in a receive mode) a non-propagating quasi-static near-field signal. Note that the near-field antenna 200 may also be coupled to a transmitter circuit (not shown) for two-way communications.

The example idealized antenna 200 includes the magnetic (H-field) antenna 205 having a resistance (R3), inductance (L1), and inductance (L2). The electric (E-field) antenna 220 having a conductive structure formed from the two loading plates 225 and 230, and the two feeding points 235, 240.

The supporting circuits 272 include a tuning circuit 274, an LNA 276 (low noise amplifier), a communications signal interface 278, and a controller 280.

The tuning circuit 274 is coupled to the first and second feed points 235, 240. The tuning circuit 274 includes a first variable tuning capacitance bank (C1), a second variable tuning capacitance bank (C2), a first variable tuning resistance bank (R1), and a second variable tuning resistance bank (R2). The capacitance banks and resistance banks are coupled to a reference potential 288 (e.g. a ground potential). The capacitive banks are coupled to the controller 280 by control line 282, and the resistance banks are coupled to the controller 280 by control line 284.

The controller 280 adjusts the first and second capacitance banks (C1), (C2) to adjust a resonant frequency of the magnetic 205 and the electric 220 antennas (e.g. to 10.6 MHz). The controller 280 adjusts the first and second resistance banks (R1), (R2) to adjust a bandwidth of the magnetic 205 and the electric 220 antennas (e.g. to 400 KHz) sufficient to allow the non-propagating quasi-static near-field signal to be received from the antennas 205, 220.

The capacitance banks (C1), (C2) are equally tuned using the control line 282 from the controller 280, and the resistance banks (R1), (R2) are equally tuned using the control line 284 from the controller 280.

The LNA 276 is coupled between the tuning circuit 274 and the communications signal interface 278. When the near-field device 270 is receiving the non-propagating quasi-static near-field signal, induced voltage 286 (Vlna) is present across the LNA 276 differential inputs. The LNA 276 amplifies the received near-field signal which is then further processed by additional radio/RFIC/baseband circuits (not shown) coupled to the communications signal interface 278. The LNA 276 is also coupled to the reference potential 288.

Since both inputs to the LNA 276 are coupled to the antennas 205, 220 the near-field device's 270 configuration is said to be balanced. The balanced circuit configuration helps reject interference signals that enter both LNA 276 input lines with the same amplitude and phase. In other examples an unbalanced device can be used.

During operation a voltage is induced in the electric (E-field) antenna 220 by a received near-field electric signal. This voltage generates a current through the E-field antenna 220.

Now discussed are example embodiments of near-field electromagnetically induction antennas that do not use conductive plates. Such example embodiments instead use/reuse two or more inductive coils for generation and reception of both near-field magnetic induced (NFMI) and near-field electric induced (NFEI) signals in a single combined NFEMI structure.

In these example embodiments at least one of the coils is open-ended, and functions as the near-field electric induction (NFEI) antenna. Thus a dual-coil with one coil open-ended functions as a near-field electromagnetic induction antenna.

Signal strength using such an open-ended coil based near-field electric induction (NFEI) antenna is improved when the open-ended coil has a planar geometry.

Additional geometric structures, such as conductive loading plates, are not required for near-field electric induction communication, and thus the NFEMI antenna can be much smaller, opening up additional applications for such an NFEMI antenna.

For the purposes of this discussion the following definitions are hereby provided:

In some example embodiments, an "open ended" element/structure is herein defined to include an element/structure that is "not galvanically connected" to any other element/structure.

In some example embodiments, a "coil" is herein defined to include a "looped" conductive element/structure, including helical, planar spiral, and three-dimensional spiral elements/structures.

In further example embodiments, an "open-ended coil" is herein defined to include elements/structures where a voltage and/or electric-field is different for (e.g. is not the same or uniform throughout) various portions of the element/structure.

In some example embodiments, a "conductive plate" is herein defined to include an element/structure where a voltage and/or electric-field is substantially the same throughout all portions of the element/structure;

FIG. 3A is a third example dual-coil NFEMI antenna 300 that does not use conductive plates. The antenna 300 includes coupled coils 215 (L1) and 217 (L2), a first feeding connection 235, a second feeding connection 240, connection point 250 and an open end 302.

Note while the reference numbers for some of the structural elements in FIG. 2B has been included in FIGS. 3A, 3B-1, 3B-2 and 3C, this is for clarity of discussion purposes only. The operation of this near-filed electromagnetic induction antenna 300, however, differs from that described in FIGS. 2A and 2B at least by not including the conductive loading plates 225, 230.

In this geometric configuration where the coupled coils 215 (L1) and 217 (L2) are nested (i.e. L2 is surrounded by L1) and because the magnetic antenna formed by magnetically coupled coils L1 and L2 is implemented as a planar structure (i.e. a distributed geometry) a significant amount of electric field is generated. Moreover, this antenna structure benefits from the property of the coupled coil antenna of generating a higher electric field for the same transmit voltage at feeding connections 235 and 240 compared to a single coil antenna and the property of receiving a larger voltage at feeding connections 235 and 240 for the same voltage induced in the antenna by the electric field as compared to a single coil antenna.

Measurements have shown that example embodiments of the NFEMI antenna, such as in example 300 of FIG. 3A, generate 40 dB more E-field compared to a single ferrite coil, such as in FIG. 1A. For example, the transmit antenna gain of such coupled coils is the ratio of the voltage between the open end of L2 and the first connection of L1 (not the series connection of both coils) and the transmit voltage at the feeding connections 235, 240.

Figures 1, 3B:
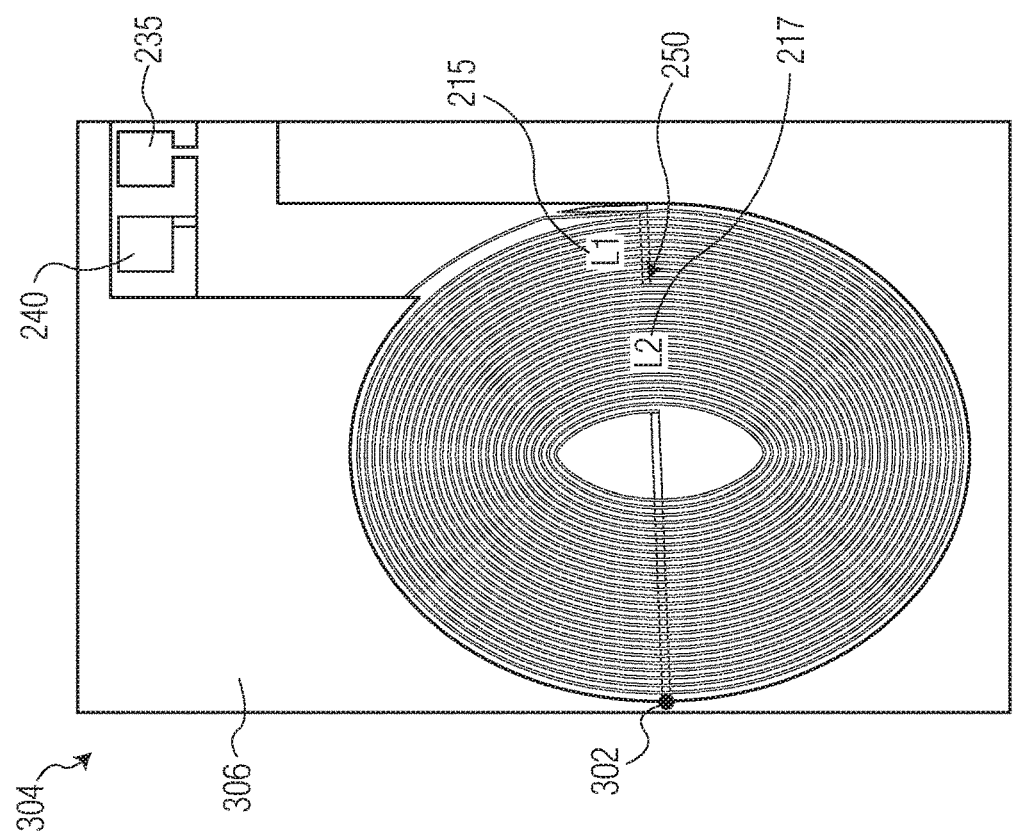
FIG. 3B-1 is one side of a fourth example dual-coil NFEMI antenna.

FIG. 3B-1 is one side 306 of a fourth example dual-coil NFEMI antenna 304 that does not use conductive plates. FIG. 3B-2 is opposite side 308 of the fourth example dual-coil NFEMI antenna 304. Shown in these Figures are the coupled coils 215 (L1) and 217 (L2), the feeding connections 235, 240, the connection point 250, and the open end 302.

Figure 3C:
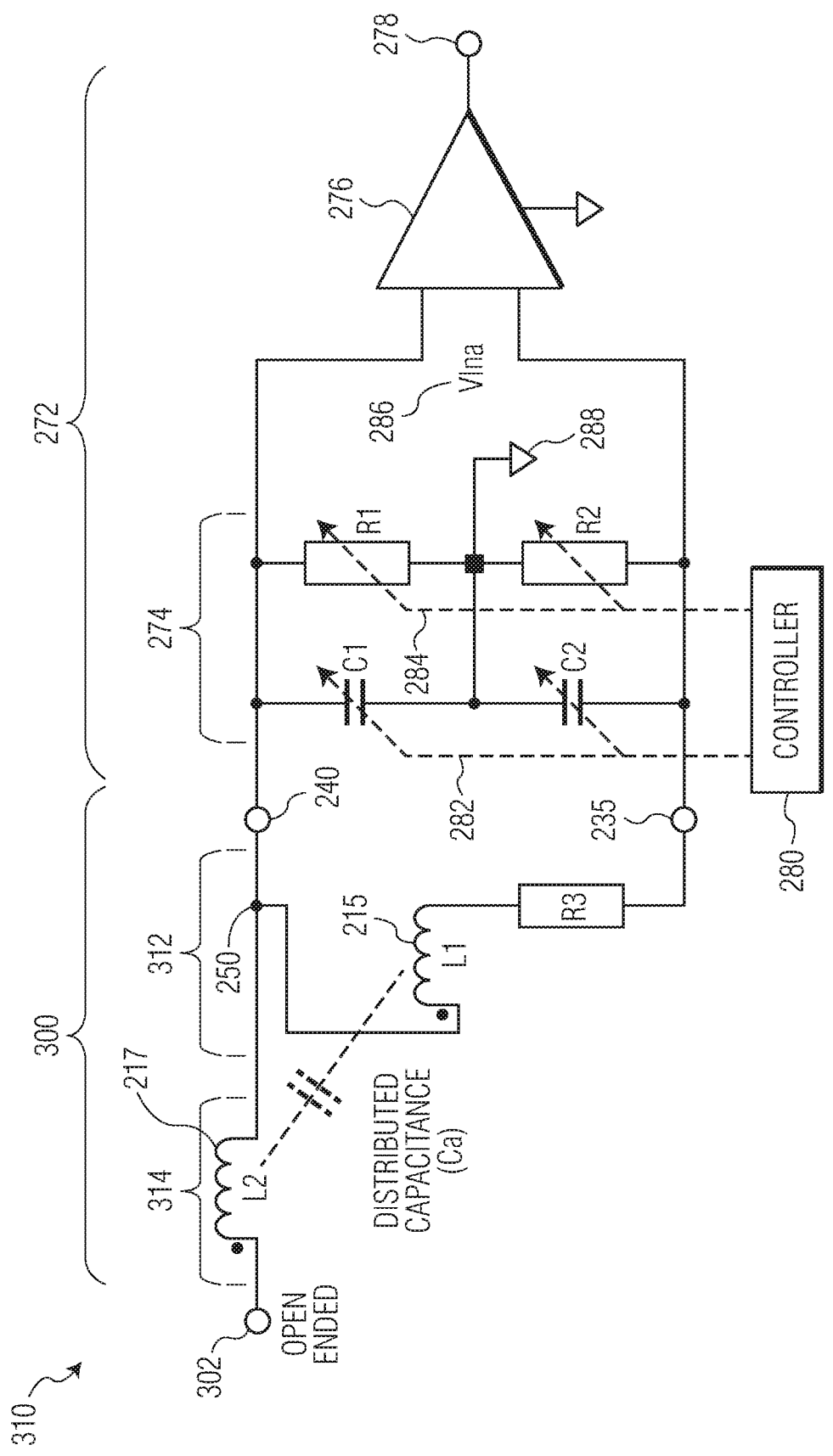
FIG. 3C is an example near-field device including the third or fourth example dual-coil near-field antenna, supporting circuits, and configured to receive non-propagating quasi-static near-field signals.

In this example antenna 304, a near-field electric antenna gain was measured to be about 1.5. This means that the voltage generating the transmitted E-field is about 3.5 dB higher than the voltage at the feeding connections 235, 240. The inductance seen at the feeding connections 235, 240 is about 3.0 µH and an equivalent average distributed capacitance (Ca), see FIG. 3C, is about 3 pF. A coupling factor, k, between first L1 and second L2 coils is about 0.43. L2=4.1 µH and LT=10.1 µH at the frequency of operation with LT=L1+L2+k*(L1+L2).

FIG. 3C is an example near-field device 310 including the third or fourth example dual-coil near-field antenna 300, 304, supporting circuits 272, and configured to receive non-propagating quasi-static near-field signals.

A magnetic (H-field) antenna 312 portion includes inductance (L1) having a resistance (R3). The electric (E-field) antenna 314 portion includes inductance (L2) having the open end 302. Due to the geometry of the antenna 300, 304, a distributed capacitance (Ca) between the inductance (L1) and inductance (L2) also exists.

The antenna 300, 304 is similarly coupled to feeding connections 235, 240 and the supporting circuits 272 as discussed in FIG. 2C.

Inductances L1 and L2 are in a series combination having a same winding direction, and thus have a same magnetic flux direction. As a result a voltage at the input of L1 is higher across L1+L2. No conductive plates are included in the antenna 300, 304.

Applications of these antennas 300, 304 include wearables for wireless on-body networks that require a small form factor and medical applications. Example medical applications can include a glucose monitoring system that is worn on-body. A glucose sensor would measure the glucose level in a user's blood at some position on a body and transfer this value using the NFEMI antennas 300, 304 to an insulin pump also worn on-body or in close proximity to the body. Due to the small form factor both devices can be located on a user's upper body.

Other applications include specialty sensors that can benefit from the small form factor of the NFEMI antenna 300, 304.

In some example embodiments, the coupled coils 215 (L1) and 217 (L2) are attached to a same side, or opposite sides, of a planar substrate. The substrate could be at least one of: a patch, a medical patch, air, a high dielectric material, or a polyethylene foam.

In some example embodiments, a magnetic permeable material is placed between or on either side of the coupled coils 215 (L1) and 217 (L2) and/or supporting circuits 272. The magnetic permeable material can be configured to shield the near-field magnetic coil 215 (L1) from the magnetic fields generated by the supporting circuits 272 (e.g. a set of electronic components). The magnetic permeable material is at least one of: a planar sheet, a ferrite shield, a ferrite sheet or a coating comprising ferrite particles in suspension.

Various instructions and/or operational steps discussed in the above Figures can be executed in any order, unless a specific order is explicitly stated. Also, those skilled in the art will recognize that while some example sets of instructions/steps have been discussed, the material in this specification can be combined in a variety of ways to yield other examples as well, and are to be understood within a context provided by this detailed description.

In some example embodiments these instructions/steps are implemented as functional and software instructions. In other embodiments, the instructions can be implemented either using logic gates, application specific chips, firmware, as well as other hardware forms.

When the instructions are embodied as a set of executable instructions in a non-transitory computer-readable or computer-usable media which are effected on a computer or machine programmed with and controlled by said executable instructions. Said instructions are loaded for execution on a processor (such as one or more CPUs). Said processor includes microprocessors, microcontrollers, processor modules or subsystems (including one or more microprocessors or microcontrollers), or other control or computing devices. A processor can refer to a single component or to plural components. Said computer-readable or computer-usable storage medium or media is (are) considered to be part of an article (or article of manufacture). An article or article of manufacture can refer to any manufactured single component or multiple components. The non-transitory machine or computer-usable media or mediums as defined herein excludes signals, but such media or mediums may be capable of receiving and processing information from signals and/or other transitory mediums.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

What is claimed is:

1. A device including a near-field electromagnetic induction (NFEMI) antenna, comprising:
   a first inductive coil having a first end coupled to a first feed connection and a second end coupled to a second feed connection;
   a second inductive coil, having a first end coupled to either end of the first inductive coil or either one of the feed connections;
   wherein a second end of the second inductive coil is electrically open-ended;
   wherein the first inductive coil is configured to receive or transmit near-field magnetic signals;
   wherein the first and second inductive coils are geometrically positioned to have a distributed capacitance between the first and second inductive coils; and
   wherein the second inductive coil is configured to receive or transmit near-field electric signals using the distributed capacitance.

2. The device of claim 1:
   wherein the first inductive coil and the feed connections are configured to carry a current; and
   wherein the current is based on the near-field magnetic signals.

3. The device of claim 1:
   wherein the second inductive coil is configured to carry a voltage; and
   wherein the voltage is based on the near-field electric signals.

4. The device of claim 1:
   wherein the second inductive coil is only galvanically coupled to either end of the first inductive coil or either one of the feed connections.

5. The device of claim 1:
   wherein the second inductive coil has a planar geometry.

6. The device of claim 5:
   wherein the planar geometry of the second inductive coil is formed in a shape including: a circle, a rectangle, a polygon, an oval, or a diamond.

7. The device of claim 1:
   wherein the first and second inductive coils have a same winding direction.

8. The device of claim 1:
   wherein the first and second inductive coils are physically juxtaposed as a set of curved parallel wires separated by a distance.

9. The device of claim 1:
   wherein the second inductive coil is surrounded by the first inductive coil; and
   wherein the electrically open-ended second end is surrounded by both the first and second inductive coils.

10. The device of claim 1:
    wherein the first and second inductive coils are coupled in series.

11. The device of claim 1:
    wherein the first and second inductive coils are configured to have a same magnetic flux direction.

12. The device of claim 1:
    wherein the second end of the second inductive coil is not galvanically connected to any other element or structure in the antenna.

13. The device of claim 1:
    wherein the second inductive coil includes a looped element or structure; and
    wherein the looped element or structure is at least one of: helical, a planar spiral, or a three-dimensional spiral.

14. The device of claim 1:
wherein the second inductive coil is configured to have a non-uniform voltage distribution during operation.

15. The device of claim 1:
wherein the second inductive coil is configured to have a linearly increasing voltage distribution, having a highest absolute amplitude at the second end which is open-ended.

16. The device of claim 1:
wherein the near-field antenna does not include a conductive loading plate.

17. The device of claim 1:
wherein the first inductive coil is configured to receive or transmit non-propagating quasi-static magnetic near-field signals; and
wherein the second inductive coil is configured to receive or transmit non-propagating quasi-static electric near-field signals.

18. The device of claim 1:
wherein the antenna is embedded in at least one of: a glucose sensor, a wearable device; a smart watch; a smartwatch housing, a wireless mobile device, an earbud, a hearing aid, a headphone, an activity tracker, or a heart rate monitor.

19. The device of claim 1:
wherein the second inductive coil is configured to receive or transmit near-field electric signals using only the distributed capacitance.

20. The device of claim 19:
wherein the distributed capacitance is uniformly distributed between the first and second inductive coils.

21. The device of claim 1:
wherein the first and second inductive coils are in a same plane.

* * * * *